United States Patent [19]

Abendschein

[11] Patent Number: 5,073,045
[45] Date of Patent: Dec. 17, 1991

[54] CONNECTOR WITH IMPROVED CLIP CONNECTOR HALF

[75] Inventor: Frederic H. Abendschein, Columbia, Pa.

[73] Assignee: AMP Incorporated, Harrisburg, Pa.

[21] Appl. No.: 675,610

[22] Filed: Mar. 25, 1991

[51] Int. Cl.$^5$ .............................. G02B 6/36; G02B 7/26
[52] U.S. Cl. ...................................................... 385/90
[58] Field of Search ................. 350/96.20, 96.21, 96.22

[56] References Cited

U.S. PATENT DOCUMENTS

| | | | |
|---|---|---|---|
| 4,046,453 | 9/1977 | Fiebelkorn et al. | 350/96.21 |
| 4,167,303 | 9/1979 | Bowen et al. | 350/96.21 |
| 4,279,466 | 7/1981 | Makuch et al. | 350/96.21 |
| 4,448,478 | 5/1984 | Matthews et al. | 350/96.21 |
| 4,611,887 | 9/1986 | Glover et al. | 350/96.21 |
| 4,645,295 | 2/1987 | Pronovost | 350/96.20 |
| 4,736,100 | 4/1988 | Vastagh | 250/227 |
| 4,762,388 | 8/1988 | Tanaka et al. | 350/96.20 |
| 4,798,440 | 1/1989 | Hoffer et al. | 350/96.20 |
| 4,872,736 | 10/1989 | Myers et al. | 350/96.20 |
| 4,960,317 | 10/1990 | Briggs et al. | 350/96.21 |

OTHER PUBLICATIONS

Optimate catalog 88-812, AMP Incorporated, 3/89, pp. 5-18.

*Primary Examiner*—William L. Sikes
*Assistant Examiner*—Robert E. Wise

[57] ABSTRACT

A connector for joining light transmitting fiber cables through a cover (14) to a transmitter and/or receiver device (3) comprises a plug connector half (6) comprising a plug (8) and a transceiver adapter (10), and a clip connector half (5) attached to and integral with the transmitter/receiver device (3) and having apertures (19) therein beveled (20) to receive latching beams (13) of the transceiver adapter (10). The clip connector half (5) further comprises a clip retention slot (21) coextensive to each aperture (19) through a cut-out (22) common to both the retention slot (21) and the aperture (19). The clip connector half (5) further comprises clips (23) each with a dimple (24) adapted to clip within a respective retention slot (21) with the dimple (24) biased through the cut-out (22) in the slot (21) and into engagement with a respective latching beam (13) upon mating of the plug connector half (6) to the clip connector half (5). The clip connector half (5) further has a window (26) on the same side of the clip connector half body (18) as the slot (21) and which is a continuation of the slot (21). The clip (23) comprises a flat, linear body with dimple (24) and wing (25) both emanating from the same plane of the body. The clip (23) slides into a respective slot (21) with dimple (24) engaged with the port (35) of a respective latching beam (13) through the slot cut-out (22) and with wing (25) projecting outward from the window (26) of the side of the clip connector half (18).

7 Claims, 8 Drawing Sheets

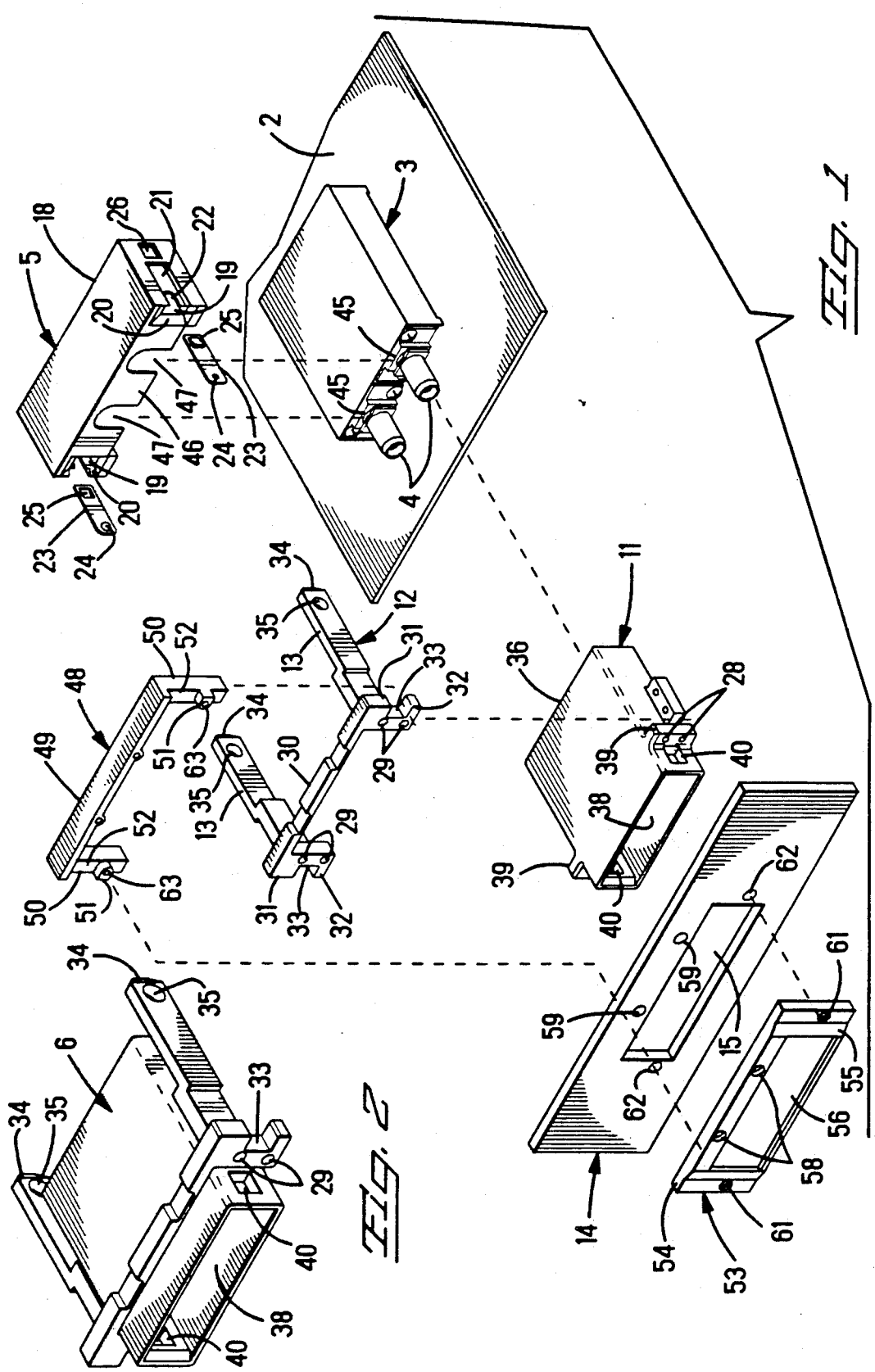

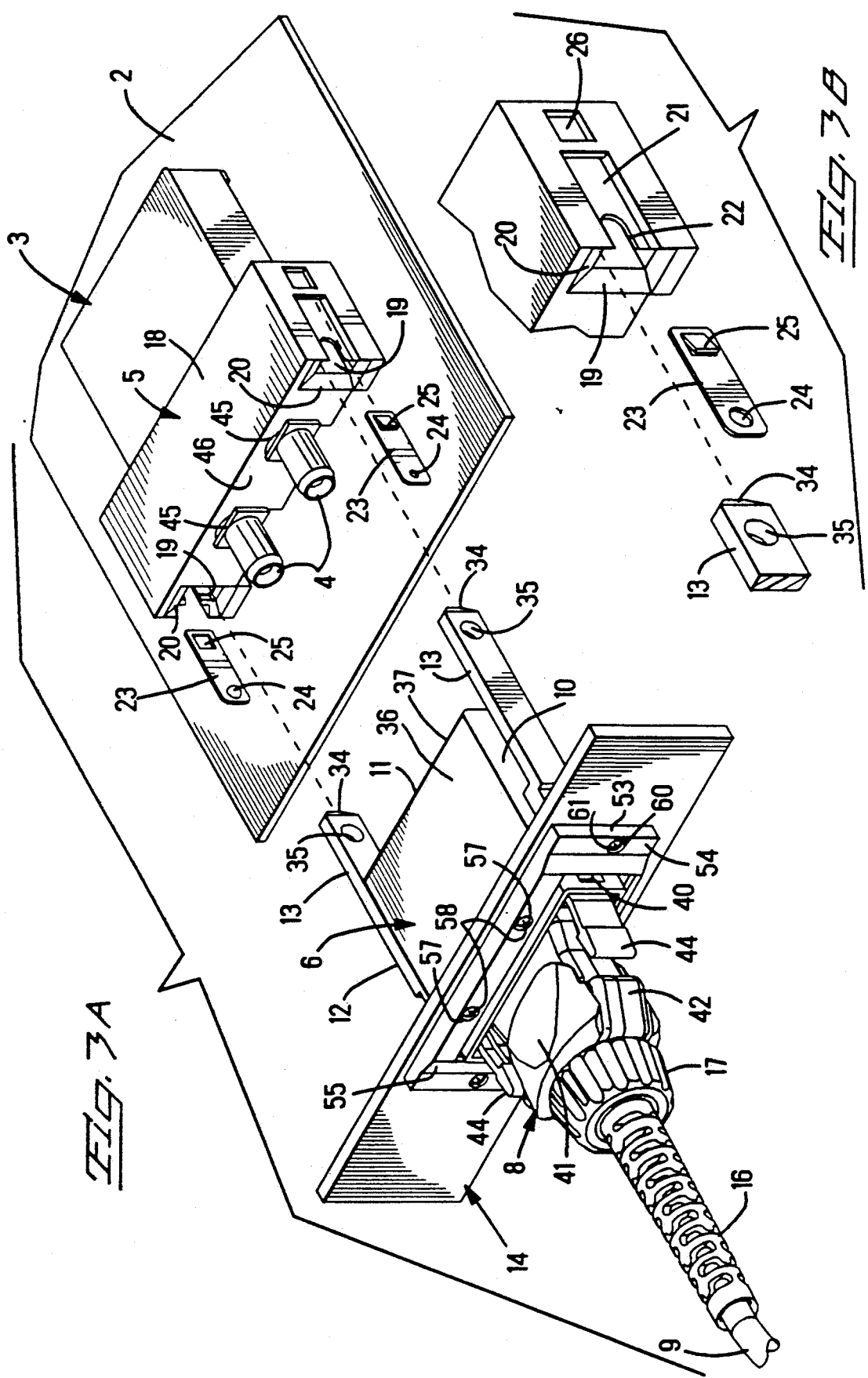

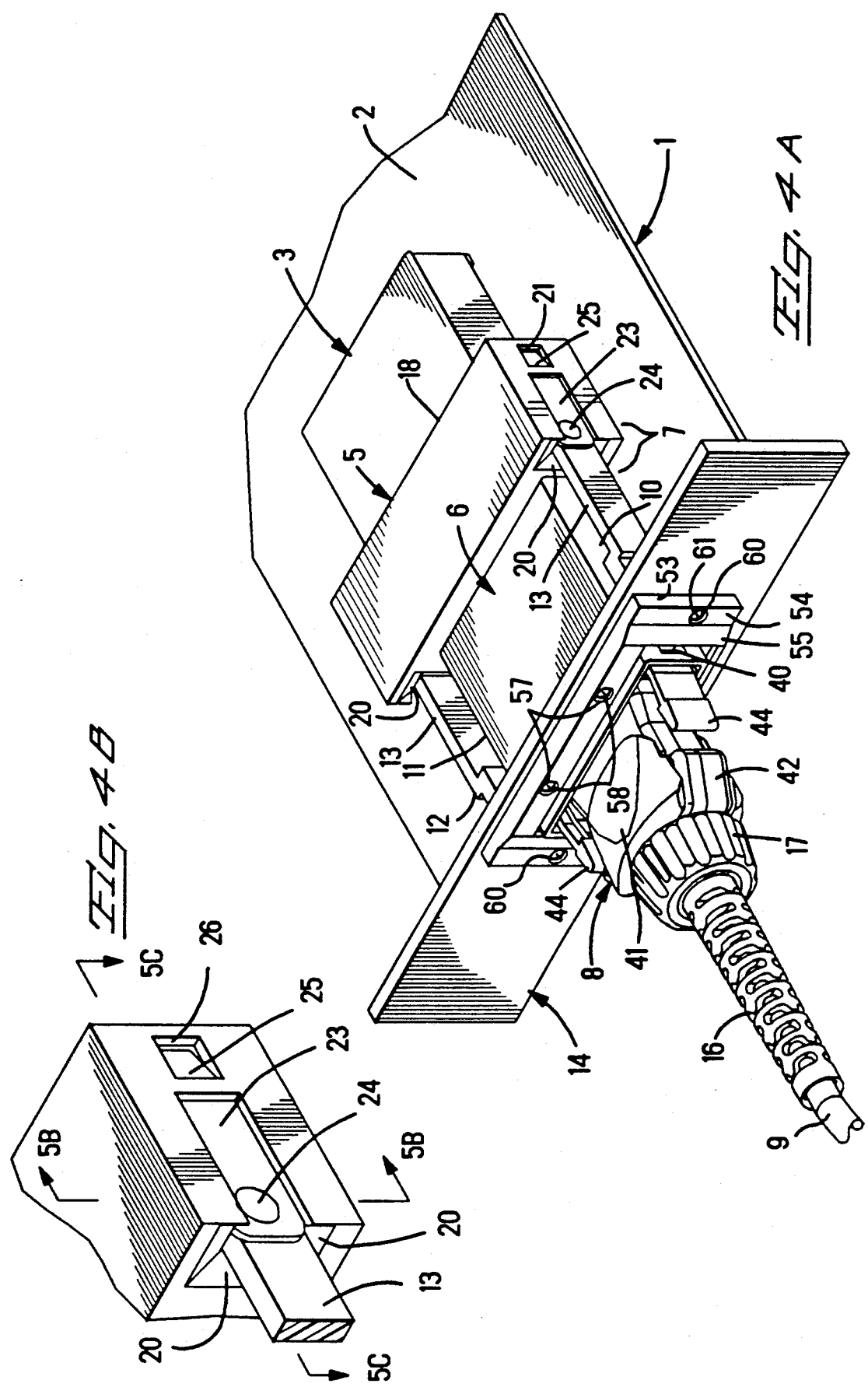

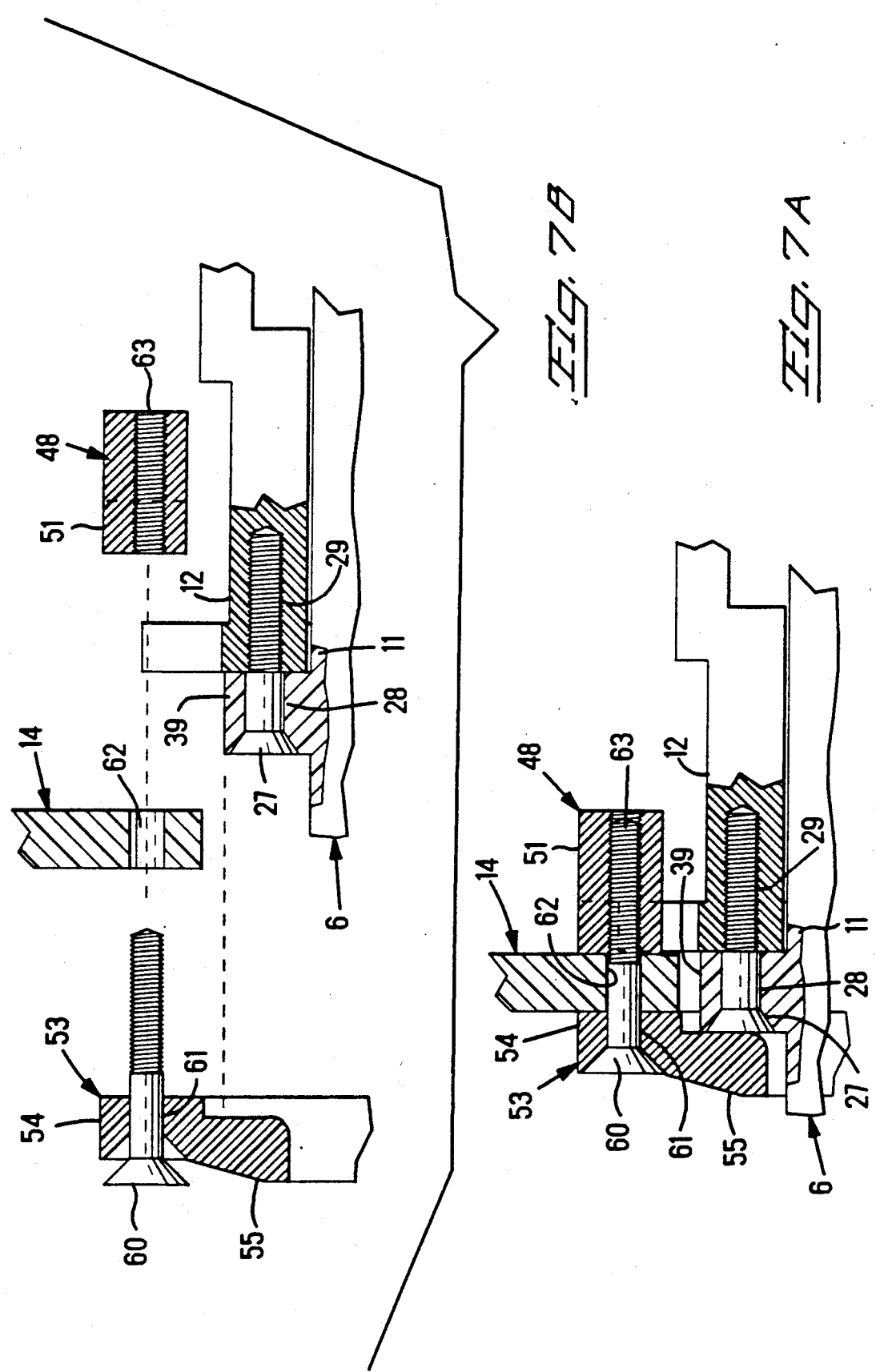

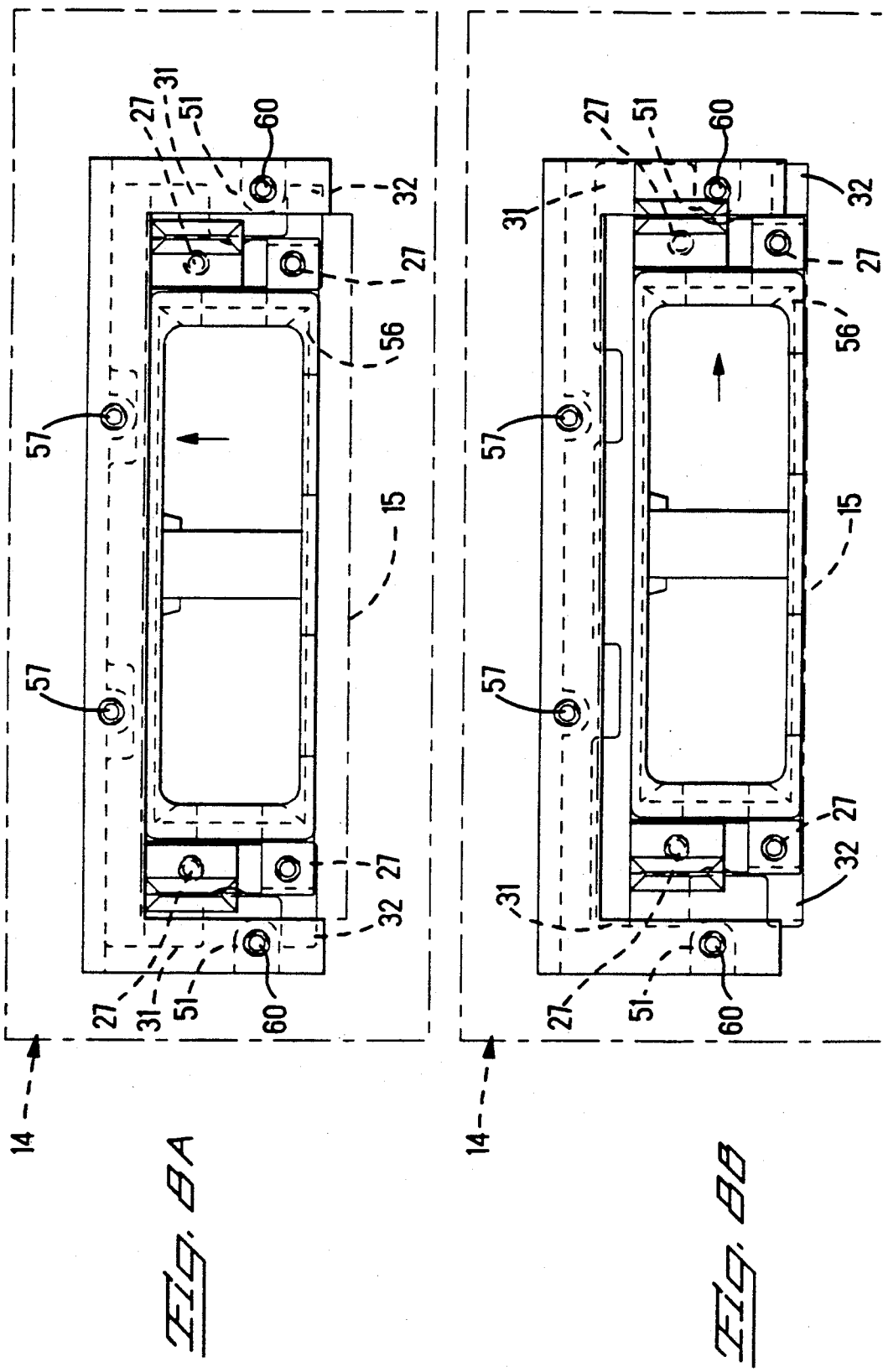

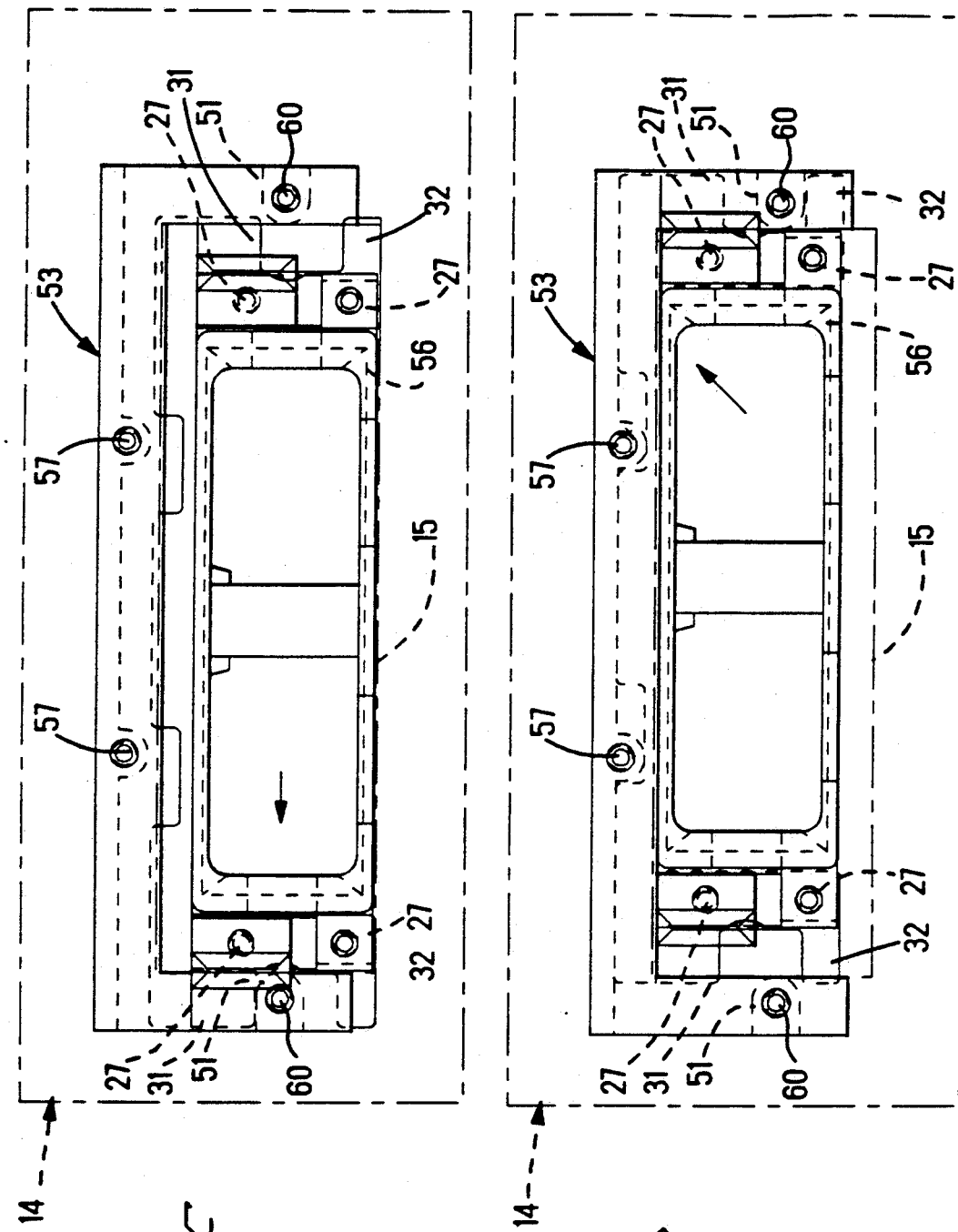

CONNECTOR WITH IMPROVED CLIP CONNECTOR HALF

FIELD OF THE INVENTION

The present invention relates to an improved clip for a clip connector half of an optical fiber connector.

BACKGROUND OF THE INVENTION

It is standard practice with respect to mating connectors to provide means which position the connector halves so that the terminals therein are aligned for a proper mating engagement. It is common to provide pins, posts, and projections in one half made to fit within complementary apertures in the other half; both integrally molded with respect to the housings of the connector halves, or added as hardware. One problem associated with interconnecting of connector halves arises when the halves are of different suppliers and are not complementary. In such instances it is necessary to provide an adapter that alters one or both of the connector halves so as to permit interconnection. A particular instance of such problem involves the replacement, within a computer bulkhead, of a circuit board-mounted transceiver of one manufacturer with a circuit board-mounted transceiver of another manufacturer. In such instance the replacement board may be characterized by receiver and transmitter ports of alignment differing from the alignment of the ports of the transceiver board which has been replaced. Precise connection between the transceiver ports with a connector through the backplane of the computer bulkhead may be impossible if, indeed, connection may be made at all.

SUMMARY OF THE INVENTION

The present invention relates to a connector for joining light transmitting fiber cables through a cover to a transmitter and/or receiver device. The connector is characterized by an clip connector half that provides both an improved retention when interconnected with latching beams of a complementary connector half and by improved life of the clip of the clip connector half. The connector comprises a plug connector half and the improved clip connector half. The plug connector half comprises a plug having an axially extending bore for receiving an optical fiber, and a transceiver adapter adapted to axially receive the plug through the cover. The transceiver adapter is a two-part structure comprising a transceiver shroud and a latching beam mechanism. The shroud is adapted to axially receive the plug and extends axially forward for alignment of the plug relative to the transmitter and/or receiver device. The latching beam mechanism is integral with the shroud and has forward extending latching beams. The mechanism comprises a main body straddling the shroud and secured thereto and having latching beams extending therefrom. Each latching beam is an elongated structural member which is secured at one end to the main body of the mechanism and which is freely flexible at the forward opposite end. Each beam has a forward beveled face and port.

Further, the connector comprises a clip connector half attached to and integral with the transmitter/receiver device and having apertures therein beveled to receive the latching beams. Each of the latching beams has a beveled forward end for interacting with the respective beveled aperture of the clip connector half to align the beam to the opening upon mating of the plug connector half to the clip connector half. Each of the latching beams has a port toward its forward end. The port is transverse to the longitudinal axis of the beam. The clip half connector further comprises a clip retention slot coextensive to each aperture through a cut-out common to both the retention window and the aperture. The clip connector half further comprises clips each with a dimple adapted to slide within a respective retention slot with the dimple biased through the cut-out in the slot and into engagement with the latching beam through the port of the beam upon mating of the plug connector half to the clip connector half. The clip connector half further has a window on the same side of the clip connector half as the slot and which is a continuation of the slot. The clip comprises a flat, linear body with a dimple and wing both emanating from the same plane of the body. The clip slides into the slot with the dimple engaged with the port of a respective latching beam through the slot cut-out and with the wing projecting outward from the window of the side of the clip connector half body.

The transmitter and/or receiver device may have mounts projecting therefrom for connecting each transmitter and/or receiver to a respective optical fiber cable which extend forward within the axial bore of the plug. Each mount has a square base which forms flanges. The clip connector half further comprises a face with arc-shaped openings for clip fit to the flanges of the mounts of the transmission and/or receiver device.

Further, the connector may comprise means associated with the plug for securing the plug within the transceiver adapter. The means may be at least one deflectable latch, with the latch cooperating with a respective port of the transceiver adapter. Further included may be a strain relief means including a tubular member with integral means for distributing bending substantially along the length of the strain relief. Means may be included on the plug and on the strain relief means to retain the strain relief means and the plug in assembled relation. With this, the plug is provided with a threaded end, and, further provided is a cap with a threaded bore complementary to the threaded end and having a bore of deceased opening for capturing the strain relief.

BRIEF DESCRIPTION OF THE DRAWINGS

FIG. 1 is a perspective view, partially exploded, of the connector with improved clip connector half of the present invention along with a cover and transmitter and/or receiver device;

FIG. 2 is a perspective view of a molded single piece transceiver adapter, one of the embodiments of the present invention;

FIG. 3A is a perspective view showing connector halves preparatory to mating, along with associated mounting structures, and FIG. 3B is an exploded perspective view of the connection between a latching beam and aperture showing the clip retention slot and clip of the present invention;

FIG. 4A is a perspective view showing mated connector halves along with associated mounting structures, and FIG. 4B is a perspective view of a connected latching beam and aperture;

FIG. 7A is a cut away view through the interconnection among cover plate, panel and half structure of FIG. 4A, and FIG. 7B is a cut away view through the same but with some parts exploded; and FIGS. 8A, 8B, 8C, 8D and 8E are all side elevation views from a rear position showing the panel front and the connector of the present invention.

DESCRIPTION OF A PREFERRED EMBODIMENT

Figure 5A:
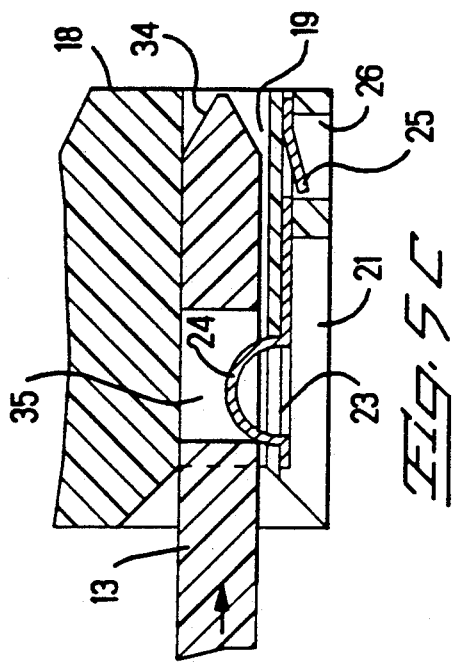
FIG. 5A is a cut away view of latching beam, aperture and clip during mating.

Referring to FIGS. 1, 3A, 3B, 4A and 4B, an electronic package 1 is shown to include a mounting structure 2 which may be a printed circuit board carrying circuit traces to electronic components such as logic and memory devices. Mounted on structure 2 is a transmitter/receiver device 3 which includes a pair of signal ports 4 suitably interconnected to components which convert electrical to optical and optical to electrical signals, i.e. transmitters and receivers. Shown also, is clip connector 5 which is a connector half, and which with half structure 6 comprises the connector 7 of the present invention as hereinafter described.

Half structure 6 includes plug 8 terminating a cable 9 to a forward portion, and transceiver adapter 10. Transceiver adapter 10 is shown as a two part structure comprising a transceiver shroud 11 and latching beam mechanism 12. Transceiver shroud 11 is adapted to axially receive plug 8. The shroud 11 extends forward axially for aligning the plug relative to the transmitter/receiver device 3. The latching beam mechanism 12 has latching beams 13 extending forward. The connector half 6 is mounted, as indicated, in a mounting structure which may be considered, in the embodiment here involved, as a panel front or cover 14 which encloses the interconnection when the connector halves 5, 6 are mated through window 15 of the panel front 14.

The plug connector half 6 further comprises strain relief means 16 which is a tubular member with integral means for distributing bending substantially along its length. The plug 8 has a threaded end (not shown). Cap 17 has a threaded bore complementary to the end of the plug 8, and has a bore of decreased opening for capturing the strain relief 16 when the cap 17 is engaged with the threaded end of the plug 8.

Shown in FIGS. 1, 3A, 3B, 4A, 4B, 5A, 5B, 5C and 6, clip connector half 5 comprises a cover body 18 having apertures 19 which are beveled 20 to receive latching beams 13 which, upon connection, are guided into the apertures 19 by the beveling 20. Clip connector half 5 further comprises clip retention slot 21 coextensive with each of apertures 19 through cut-out 22 common to both the retention slot 21 and the aperture 19, and further comprises clips 23 each with dimple 24. Each clip 23 has wing 25 which is a portion of the clip 23 biased upward to form the said wing 25 with function as hereinafter described. The clips 23 are adapted to fit within respective retention slot 21 with dimple 24 biased through respective cut-out 22 in the slot 21 and wing 25 providing retention by snap fit within a window 26 which is a continuation of slot 21 beneath the cover body 18 of the connector half 5.

The transceiver adapter 10 may be a molded integral structure as shown in FIG. 2 characterized by a transceiver shroud portion 11 and latching beam mechanism portion 12 or the adapter 10 may be a two part structure, as shown in the FIG. 1, comprising a transceiver shroud part 11 and a latching beam mechanism 12 secured together with an inter-engaging means to form said integral two part structure—the transceiver adapter 10. The inter-engaging means may be bolts 27 through the commonly aligned holes 28 of the transceiver shroud 11 and holes 29 of the latching beam mechanism 12.

Referring to FIGS. 1, 3A and 4A, latching beam mechanism 12 is in the form of a main body 30 having latching beams 13 extending therefrom and side extending flanges, both upper 31 and lower 32, which define a gap 33 with utility as hereinafter described. Each latching beam 13 is a beam shaped body with forward beveled face 34 and port 35. When interconnected to form transceiver adapter 10, the main body 30 of the latching beam mechanism 12 straddles shroud 11 with inter-engaging holes 28 aligned with holes 29 of the shroud 11 as aforesaid.

Transceiver shroud 11 consists of a body 36 having forward mating face 37, axial cavity 38 to receive the plug 8, extending flanges 39 with holes 29 and latch ports 40 to both sides of body 36.

Plug 8 is constructed for disconnect coupling through means of transceiver adapter 10 and is a hollow body of molded upper cover 41 and molded lower cover 42. The covers 41, 42 are of insulated plastic material formed by molding into a shape that has an exterior with dimensions that intermate with the transmitter/receiver via transceiver adapter 10. Upper cover 41 and lower cover 42 are complementarily contoured in their interiors so as to form a profiled passageway 43 having optical cables disposed therein. Upper cover 41 intermates with lower cover 42 by snap-in connection. Threaded cap 17 secures the upper cover 41 together with the lower cover 42 to encompass and provide an enclosure for the optical fibers of optical cable 9. The plug 8 is secured within the transceiver adapter 10 by biased fit of latches 44 through latch ports 40.

Further shown in FIGS. 1, 3A and 4A is transmitter/receiver device 3 and clip connector half 5. Transmitter/receiver ports 4 have square bases which form flanges 45. Clip connector half 5 is formed of cover body 18 having mating face 46 characterized by openings 47 which form lips that snap fit onto flanges 45.

With reference to FIGS. 1, 3A, 3B, 4A, 4B, 5A, 5B and 5C, during connection of plug connector half 6 with clip connector half 5, the apertures 19 of clip connector half 5 receive respective latching beams 13 of plug connector half 6 with each bevel 20 interacting with the respective beveled face 34 of each latching beam 13 to guide each latching beam 13 into a respective receiving aperture 19. At the same time, a beveled face 34 of each beam 13 contacts a dimple 24 of clip 23 and deflects the dimple 24 outward against the bias of clip body 23. As the beams 13 are further inserted into aperture 19, each dimple 24 aligns with a port 35 and snaps into said port 35 as the dimple 24 clears the body of the beam 13. The dimple 24 remains imposed into the port 35 maintaining the beam 13 in place by the bias of the clip body 23 and the retention of the clip body 23 to the clip connector half 5 by means of the seating of wing 25 within window 26. Simultaneously with the mating of the latching beams 13 of the connector half 6 within respective apertures 19 and with clips 23 of clip connector half 5, transceiver/receiver device 3 passes into axial cavity 38 of transceiver shroud 11 thereby connecting the transmitter and/or receiver 3 to a respective optical fiber disposed within the transceiver shroud 11.

Again, with reference to FIGS. 1, 3A, 4A, 7A, 7B, 8A, 8B, 8C, 8D and 8E, shown is the floating fit of the transceiver adapter 10 which permits alignment to transmitter/receiver device 3 and to clip connector half 5 even in circumstances where these elements may be misaligned thus prohibiting proper mating with prior art transceiver adapters 10 and associated mountings. Shown is a retention frame 48 with main body 49 and extending arms 50 each with rearward extending pedestals 51 which, with rearward extending main body 49 define gaps 52. Retention frame 48 is adapted to straddle transceiver adapter 10 and be immobilized by a secure connection to cover 14 which is provided by an interconnection to cover plate 53. Cover plate 53 has two sections, a relatively flat section 54, the bottom of which fits flush to cover 14, and an outcrop section 55 that rises from the plane of the flat section 54 and which defines cover plate window 56. Cover plate 53 is secured to cover 14 by bolts 57 or the like through holes 58 of cover plate 53 and holes 59 of cover 14. The interconnection means between retention frame 48 and plate 53 may be a bolt 60 or the like through commonly aligned holes 61 of cover plate 53, holes 62 of cover 14 and holes 63 of retention frame 48.

With the straddling of retention frame 48 over transceiver adapter 10, and the interconnection of the frame 48 to cover 14 and to plate 53, pedestals 51 fit within respective gaps 33 of latching beam mechanism 12. Each gap 52 of retention frame 48 is particularly defined by main body 49 and pedestal 51 so as to loosely accommodate respective flange 31 of latching beam mechanism 12, and gap 33 of latching mechanism 12 is particularly defined by respective upper 31 and lower 32 flanges so as to loosely accommodate respective pedestal 51 of frame 48 whereby transceiver adapter 10 is captivated by retention frame 48 but in such a manner as to permit vertical movement of the adapter 10 within said frame 48 and relative to said cover 14. Further, the spacing between the pedestals 51 exceeds the distance between the gaps 33 so that the transceiver adapter 10 is permitted horizontal movement as well.

Figure 8E:
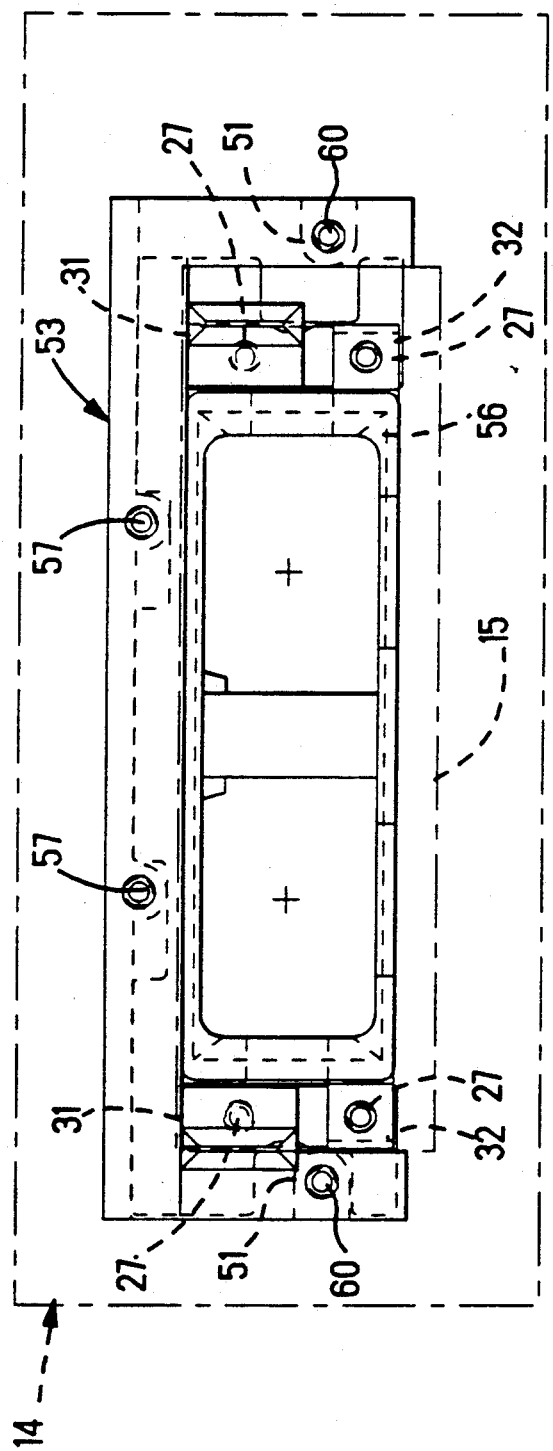

FIGS. 7A and 7B show the connection among the retention frame 48, panel front 14 and cover plate 53, the connection of the transceiver shroud 11 and latch beam mechanism 12 and the floating fit of shroud 11 and latch beam mechanism 12 within the combination of retention frame 48, panel front 14 and cover plate 534, while FIGS. 8A, 8B, 8C, 8D and 8E further illustrate the floating of the transceiver adapter within the fixed structure which is the combination of the retention frame 48, the panel front 14 and the cover plate 53. During mating of plug 8—as encompassed within transceiver adapter 10—with the transmitter/receiver device 3, misalignment may require that plug 8 be slightly elevated with respect to cover 14 in order to permit mating. FIG. 8A shows the combined structure of the retention frame 48, panel front 14 and cover plate 53 permitting the upward floating of the plug 8 and transceiver adapter 10 therewithin to facilitate mating. Correspondingly, FIG. 8B shows the plug 8 and transceiver adapter 10 floating to the right for mating; FIG. 8C shows floating to the left; FIG. 8D, floating upward and to the right; and FIG. 8E, floating upward and to the left.

Figure 5B:
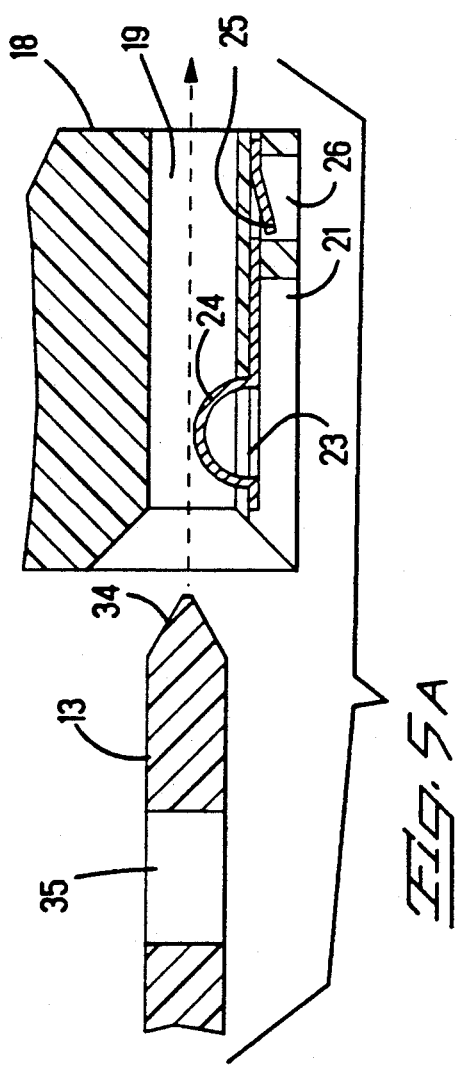
FIG. 5B is a cut away view through line 5B—5B of FIG. 4B.
Figure 6:
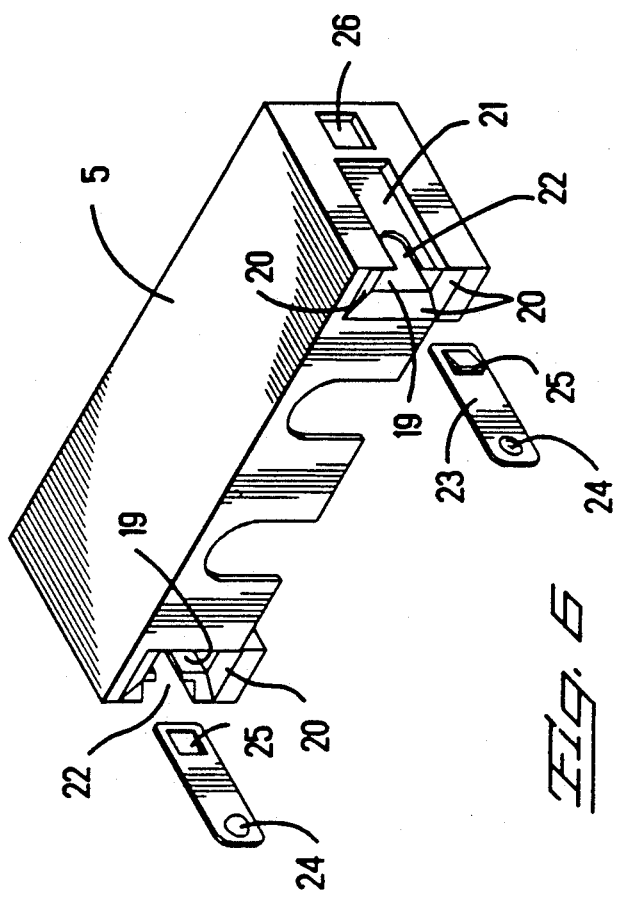
FIG. 6 is a perspective view of the clip connector half of the invention.
Figure 5C:
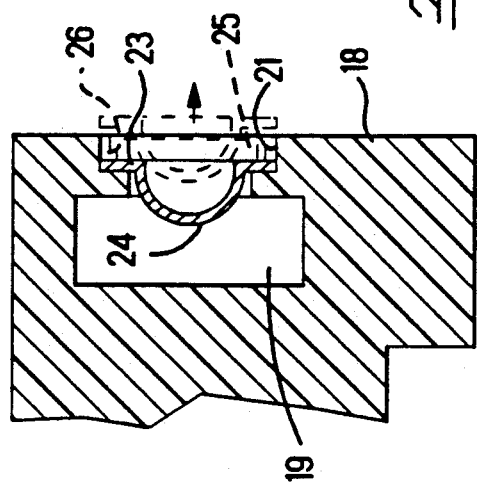
FIG. 5C is a cut away view through line 5C—5C of FIG. 4B.

During connection of half structure 6 to clip connector half 5, as illustrated in FIGS. 5A, 5B and 5C, latching beams 13 approach respective clip apertures 19 with beveled face 34 of each beam contacting beveling 20 of each respective clip aperture 19. Interplay of beveled face 34 with beveling 20 leads each beam into respective aperture 19. As mating takes place the floating of the transceiver adapter 10 and plug 8 permits adjustment of the alignment of the beam 13 to the aperture 19 along the face of beveling 20. At the same time, the floating feature permits alignment of signal ports 4 of the transmitter/receiver device 3 to respective optical fibers disposed by ferrules (not shown) within plug 8. As the beam 13 progresses within aperture 19, beveled face 30 contacts dimple 24 of clip 23. Beveled face 34 imposes against dimple 24, which is biased into aperture 19 through port 22. Beveled face 34 pushes dimple 24 against the bias and to without the port 22, permitting beam 13 to progress up aperture 19. Dimple 24 snaps back into aperture 19 and into seat within port 35 of the latching beam 13, as port 35 becomes aligned with the port 22. The snap fit of the dimple 24 into port 35 retains the beam 13 within the aperture 19 of the clip half 5 with a predetermined retention force.

Illustrated has been the improved clip connector half 5 of the present invention in conjunction with a connector having a float fit feature. While this description constitutes a presently preferred embodiment of the invention, it should be recognized that the connector 7 of the present invention may take other forms so long as it is characterized by a clip connector half body 5 having apertures 19 each therein beveled 20 to receive a respective latching beam 13, clip retention slots 21 each coextensive to each aperture 19 through a cut-out 22 common to both the retention slot 21 and the aperture 19, and a clip 23 with a dimple 24, the clip 23 adapted to slide within a respective retention slot 21 with the dimple 24 biased through the cut-out 22 in the slot 21 and into engagement with the latching beam 13 through the port 35 of the beam 13 upon mating of the plug connector half 6 to the clip connector half 5. Accordingly, it should be understood that the invention is to be limited only insofar as required by the scope of the following claims.

What is claimed is:

1. A connector for joining light transmitting fiber cables through a cover to a transmitter and/or receiver device comprising:

a plug connector half comprising; a plug having axial extending bore for receiving an optical fiber; and a transceiver adapter adapted to axially receive said plug through said cover, wherein said transceiver adapter is a two-part structure comprising; a transceiver shroud adapted to axially receive said plug and extending forward axially for alignment of said plug relative to said transmitter and/or receiver device; and, integral with said shroud, a latching beam mechanism having forward extending latching beams each having a port transverse through the longitudinal axis of said beam and located toward said forward end;

and clip connector half attached to and integral with said transmitter/receiver device and comprising a clip connector half having apertures each therein beveled to receive a respective latching beam, clip retention slots each coextensive to each aperture through a cut-out common to both the retention slot and the aperture, and a clip with a dimple, the clip adapted to slide within a respective retention slot with the dimple biased through the cut-out in the slot and into engagement with the latching beam through the port of the beam upon mating of the plug connector half to the clip connector half.

2. The connector of claim 1 wherein the clip connector half further comprises windows each on the same side of the said clip connector half as a respective slot and each of which is a continuation of the slot.

3. The connector of claim 2 wherein the clip comprises a flat, linear body with dimple and wing both emanating from the same plane of the body, and each clip is fitted to said clip connector half by slide fit into each respective slot with dimple engaged with the port of a respective latching beam through the slot cut-out and with wing projecting outward from the window of the side of the clip connector half.

4. The connector of claim 3 wherein said clip connector half further comprises face with arc-shaped openings for clip fit to said transmission/receiver device.

5. The connector of claim 1, 2, 3 or 4 wherein said latching beam mechanism comprises a main body straddling said shroud and secured thereto and having latching beams extending therefrom.

6. The connector of claim 5 wherein each latching beam of said latching beam mechanism is an elongated structural member secured at one end to said main body and freely flexible at the forward opposite end.

7. The connector of claim 6 wherein each of said latching beams has beveled forward end for interacting with the said beveled aperture of said clip connector half to align said beams to said aperture opening upon mating of said plug connector half to said clip connector half.

* * * * *